US010656421B2

(12) United States Patent
Piskunov et al.

(10) Patent No.: US 10,656,421 B2
(45) Date of Patent: May 19, 2020

(54) LIGHTGUIDE STRUCTURE, OPTICAL DEVICE AND IMAGING SYSTEM (71) Applicant: SAMSUNG ELECTRONICS CO., LTD., Suwon-si (KR)

(72) Inventors: Dmitry Evgenievich Piskunov, Moscow region (RU); Nikolay Victorovich Muravev, Moscow region (RU); Mikhail Vyacheslavovic Popov, Moscow region (RU); Natalia Vladimirovna Zakharova, Moscow region (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 15/307,663

(22) PCT Filed: Sep. 11, 2014

(86) PCT No.: PCT/KR2014/008449
§ 371 (c)(1),
(2) Date: Oct. 28, 2016

(87) PCT Pub. No.: WO2016/006758
PCT Pub. Date: Jan. 14, 2016

(65) Prior Publication Data
US 2017/0045745 A1   Feb. 16, 2017

(30) Foreign Application Priority Data

Jul. 11, 2014 (RU) .............................. 2014128533

(51) Int. Cl.
*G02B 27/14* (2006.01)
*G02B 27/01* (2006.01)
(Continued)

(52) U.S. Cl.
CPC .......... *G02B 27/0172* (2013.01); *G02B 6/00* (2013.01); *G02B 6/002* (2013.01); *G02B 6/003* (2013.01);
(Continued)

(58) Field of Classification Search
CPC ............ G02B 27/0172; G02B 27/0176; G02B 6/002; G02B 6/0048; G02B 27/0081;
(Continued)

(56) References Cited

U.S. PATENT DOCUMENTS 4,432,039 A    2/1984  Cibie
5,696,521 A    12/1997 Robinson et al.
(Continued)

FOREIGN PATENT DOCUMENTS

CN    102165357 A    8/2011
CN    102326112 A    1/2012
(Continued)

OTHER PUBLICATIONS

Russian Communication dated Sep. 21, 2016 issued by the Russian Patent Office in counterpart Russian Patent Application No. 2014128533.
(Continued)

*Primary Examiner* — Alicia M Harrington
(74) *Attorney, Agent, or Firm* — Sughrue Mion, PLLC (57) ABSTRACT It is provided that a lightguide structure comprising: a first portion disposed to receive light rays emitted by an external display, a second portion disposed to provide, to a second surface facing a viewer, the light rays from the first portion and ambient light, wherein the second portion has a plurality of first surfaces for reflecting light rays and at least one second surface which the light rays and the ambient light perpendicularly enter into and pass through, an intermediate portion disposed to connect between the first portion and the
(Continued)

second portion and reflect the light rays from the first portion for transferring the light rays to the second portion.

17 Claims, 5 Drawing Sheets

(51) Int. Cl.
| | |
|---|---|
| *G02B 6/00* | (2006.01) |
| *G09F 13/00* | (2006.01) |
| *G06F 1/16* | (2006.01) |
| *G06F 3/01* | (2006.01) |
| *G06F 1/00* | (2006.01) |
| *F21V 8/00* | (2006.01) |
| *G02B 27/00* | (2006.01) |

(52) U.S. Cl.
CPC ....... *G02B 6/0048* (2013.01); *G02B 27/0081* (2013.01); *G02B 27/0176* (2013.01); *G06F 1/00* (2013.01); *G06F 1/163* (2013.01); *G06F 3/011* (2013.01); *G09F 13/00* (2013.01); *G02B 2027/015* (2013.01); *G02B 2027/0118* (2013.01); *G02B 2027/0152* (2013.01); *G02B 2027/0178* (2013.01)

(58) Field of Classification Search
CPC . G02B 6/003; G02B 6/00; G02B 6/10; G02B 2027/0118; G02B 2027/0178; G02B 27/015; G06F 3/011; G06F 1/163; G06F 1/00; G09F 13/00
See application file for complete search history.

(56) References Cited

U.S. PATENT DOCUMENTS

| | | | |
|---|---|---|---|
| 5,838,490 A | 11/1998 | Fritz | |
| 6,144,347 A | 11/2000 | Mizoguchi et al. | |
| 6,147,807 A | 11/2000 | Droessler et al. | |
| 6,580,529 B1 | 6/2003 | Amitai et al. | |
| 6,805,490 B2 | 10/2004 | Levola | |
| 6,825,987 B2 | 11/2004 | Repetto et al. | |
| 7,457,040 B2 | 11/2008 | Amitai | |
| 7,724,441 B2 | 5/2010 | Amitai | |
| 8,384,999 B1 | 2/2013 | Crosby et al. | |
| 8,433,172 B2 | 4/2013 | Pascal et al. | |
| 8,471,967 B2 | 6/2013 | Miao et al. | |
| 8,662,686 B2 * | 3/2014 | Takagi ............... | G02B 27/0172 359/633 |
| 8,743,464 B1 * | 6/2014 | Amirparviz ............ | G02B 27/01 359/633 |
| 8,773,599 B2 | 7/2014 | Saeedi et al. | |
| 8,970,961 B2 | 3/2015 | Dobschal et al. | |
| 9,013,793 B2 | 4/2015 | Gupta et al. | |
| 9,436,010 B2 | 9/2016 | Komatsu et al. | |
| 9,915,823 B1 * | 3/2018 | Kress ................. | G02B 27/0172 |
| 2007/0188837 A1 | 8/2007 | Shimizu et al. | |
| 2009/0274419 A1 | 11/2009 | Sayers et al. | |
| 2010/0046070 A1 | 2/2010 | Mukawa | |
| 2011/0211239 A1 | 9/2011 | Mukawa et al. | |
| 2012/0001833 A1 | 1/2012 | Lindig et al. | |
| 2012/0194549 A1 | 8/2012 | Osterhout et al. | |
| 2013/0016292 A1 | 1/2013 | Miao et al. | |
| 2013/0016413 A1 | 1/2013 | Saeedi et al. | |
| 2013/0070338 A1 | 3/2013 | Gupta et al. | |
| 2013/0077141 A1 | 3/2013 | Akutsu et al. | |
| 2013/0083404 A1 * | 4/2013 | Takagi ............... | G02B 27/0101 359/633 |
| 2013/0222896 A1 | 8/2013 | Komatsu et al. | |
| 2013/0250429 A1 | 9/2013 | Dobschal et al. | |
| 2014/0036361 A1 | 2/2014 | Woodgate et al. | |
| 2015/0177519 A1 * | 6/2015 | Cakmakci .......... | G02B 27/0172 359/631 |

FOREIGN PATENT DOCUMENTS

| | | |
|---|---|---|
| CN | 103293674 A | 9/2013 |
| CN | 103620479 A | 3/2014 |
| CN | 103765294 A | 4/2014 |
| CN | 103890637 A | 6/2014 |
| EP | 1 385 023 A1 | 1/2004 |
| EP | 2 732 328 B1 | 4/2016 |
| JP | 2012088472 A | 5/2012 |
| JP | 2012198260 * | 10/2012 |
| WO | 2013/062654 A1 | 5/2013 |

OTHER PUBLICATIONS

Russian Communication dated Mar. 24, 2016 issued by the Russian Patent Office in counterpart Russian Patent Application No. 2014128533.
International Search Report dated Mar. 16, 2015 issued by the International Searching Authority in counterpart International Application No. PCT/KR2014/008449 (PCT/ISA/210/220/237).
Communication dated Dec. 1, 2017, issued by the European Patent Office in counterpart European Application No. 14897243.3.
Communication dated Dec. 13, 2017, issued by the State Intellectual Property Office of People's Republic of China in counterpart Chinese Application No. 201510404303.4.
Communication dated Aug. 21, 2018, issued by the State Intellectual Property Office of P.R. China in counterpart Chinese Application No. 201510404303.4.

* cited by examiner

LIGHTGUIDE STRUCTURE, OPTICAL DEVICE AND IMAGING SYSTEM

TECHNICAL FIELD

The present invention relates generally to optical imaging, and in particular, to a lightguide structure used for displaying one or more virtual objects in a background image, an optical device using one or more such lightguide structures, and an imaging system provided with one or more such optical devices.

The present invention can be applied at exhibitions, museums, theaters, concert and sports halls, stadiums and sports venues in the advertising industry, in cars, gaming and simulation systems, and in other places where it is necessary to provide users with virtual images of different objects against the background of surroundings.

BACKGROUND ART

Conventional optical devices of augmented reality, i.e. optical devices for displaying the combination of virtual images and background images, are usually made as a helmet or glasses and have optical systems in front of a user's eye or eyes. The optical devices of augmented reality are based on the combination of an eyepiece to enlarge an image formed by compacted LCD, LCoS, CRT or OLED displays, or other spatial light modulators and an image combiner based on, for example, a beam-splitting cube or a semitransparent plate. The eyepiece and the beam splitter are often made as a monolithic structure. The disadvantage of such devices is their big size and weight.

To eliminate the above-mentioned disadvantage, lightguides with different embedded structures can be used. One example is presented in U.S. Pat. No. 8,433,172 disclosing an optical guide provided with two faces, an injection section for entry of a light beam into the optical guide, an extraction section exiting the light beam. The extraction section comprises a plurality of microstructures located on a surface of one of the two faces of the optical guide. The microstructures are made as prisms having a calculated angle in order to send back the light beam at a given angle relative to the opposite surface enabling the exit of the light beam from the optical guide. The main drawback of the described device is brightness non-uniformity because of properties of prism geometry separated by flat surfaces.

Figure 12:
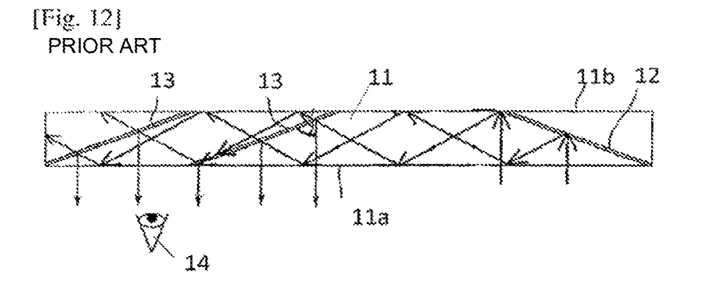
FIG. 12 illustrates the behavior of light rays inside the optical guide known from the prior art.

The closest prior art for the present invention is an optical device described in U.S. Pat. No. 7,457,040. FIG. 12 shows the side view of a lightguide optical element included in this device. As shown, the lightguide optical element comprises a planar light-transmitting substrate 11 having at least two major surfaces 11a, 11b and edges, an optical means 12 for coupling light into the substrate 11 by total internal reflection and at least one partially reflecting means 13 located inside the substrate 11. The first reflecting surface of the optical means 12 is illuminated by a collimated light beam emanating from a light source (not shown) located behind the device. The reflecting surface reflects the incident light beam such that the light beam is trapped inside the substrate 11 by total internal reflection. After several reflections from the surfaces 11a, 11b of the substrate 11, the trapped light beam reaches the selectively reflecting surface of the means 13, which couples the light beam out of the substrate 11 into a viewer's eye 14. The main drawback of the described device is the necessity of expensive coatings with predefined reflectance and transmittance properties depending on an incidence angle.

DISCLOSURE OF INVENTION

Technical Problem

It is provided that a lightguide structure used for displaying one or more virtual objects in a background image to eliminate the drawbacks.

Solution to Problem

According to a first aspect, a lightguide structure is provided. The lightguide structure comprises a first part, a second part, and an intermediate part by which the first part and the second part are coupled to each other. The first part is configured to receive light rays emitted by an external display and, due to total internal reflection, provide the propagation of the light rays though the intermediate part to the second part. The second part is made as a stepped structure having a top surface and a bottom surface. The top surface has at least two portions inclined relative to the bottom surface and at least one portion disposed between said at least two inclined portions and substantially parallel to the bottom surface. Due to such stepped configuration of the second part, the light rays which are reflected from the inclined portions of the top surface are outputted outwards. Furthermore, the stepped structure is configured to provide the passing of ambient light incident on the top surface through itself towards a viewer together with the outputted light rays.

In one embodiment, the bottom surface and all portions of the top surface of the stepped structure can be planar.

In another embodiment, all portions of the top surface of the stepped structure can be curved.

In yet one embodiment, the bottom surfaces of the first part, the second part and the intermediate part can be aligned with each other.

In one more embodiment, the joint places of the different portions of the top surface of the stepped structure can be rounded.

All portions of the top surface of the stepped structure can have equal lengths, or some or all portions of the top surface of the stepped structure can have different lengths.

Furthermore, the first part, the second part and the intermediate part can be implemented as a monolithic structure.

Each of the portions inclined relative to the bottom surface of the stepped structure can be coated with a mirror coating. The mirror coatings can be sensitive to the polarization of the light rays emitted by the external display.

In one more embodiment, the lightguide structure can further comprise a compensating part. The structure of the compensating part should be identical to the structure of the second part so that the compensating part adjoins to the second part with no gap therebetween.

Moreover, the top and bottom surfaces of the intermediate part can be inclined relative to the bottom surface of the second part, and/or the top and bottom surfaces of the intermediate part can be curved.

Preferably, the first part has a convex structure, in particular a wedge-like structure.

According to a second aspect, an optical device is provided. The optical device comprises: a display configured to emit light rays; an optical means configured to direct the light rays along its optical axis; and at least one lightguide structure according to the first aspect. The lightguide structure is arranged on the optical axis of the optical means such that the light rays from the display are incident on the first part.

In one embodiment, the display can be made as a microdisplay to provide better compactness.

In other embodiment, the optical means can comprise an eyepiece or collimating lens.

According to a third aspect, an imaging system is provided. The system comprises: at least one optical device according to the second aspect; and a processor connected to the optical device and configured to handle images for display to a user through the optical device.

The system can further comprise a radio interface configured to receive and transmit interactive content via radio waves.

The system can further comprise an optical interface configured to capture images and send the captured images to the processor. The optical interface can comprise a camera, a camcorder, projection lens, or any combination thereof.

The system can further comprise an acoustical interface configured to receive and transmit interactive content via acoustical waves. The acoustical interface can comprise a microphone, a dynamic, a bone conduction transducer, or any combination thereof.

In some embodiments, the system can be made in the form of a helmet or glasses.

Other features and advantages of the present invention will be apparent upon reading the following detailed description and reviewing the accompanying drawings.

Advantageous Effects of Invention

The provided lightguide structure is used for eliminating the drawbacks.

BRIEF DESCRIPTION OF DRAWINGS

The essence of the present invention is explained by the accompanying drawings in which:

FIG. 11b illustrates the construction of the right earpiece of the glasses of FIG. 11a;

BEST MODE FOR CARRYING OUT THE INVENTION

It is provided that a lightguide structure comprising a first part, a second part and an intermediate part by which the first part and the second part are coupled to each other, wherein the first part is configured to receive light rays emitted by an external display and, due to total internal reflection, provide the propagation of the light rays though the intermediate part to the second part, the second part is made as a stepped structure having a top surface and a bottom surface, the top surface having at least two portions inclined relative to the bottom surface and at least one portion disposed between said at least two inclined portions and substantially parallel to the bottom surface, and the stepped structure is configured to output outwards the light rays which are reflected from the inclined portions of the top surface.

It is provided that the optical device comprising a display configured to emit light rays, an optical means configured to direct the light rays along its optical axis and at least one lightguide structure according to any one of claims 1-13, wherein the at least one lightguide structure is arranged on the optical axis of the optical means such that the light rays from the display are incident on the first part.

It is provided that the imaging system comprising at least one optical device and a processor connected to the optical device and configured to handle images for display to a user through the optical device.

MODE FOR THE INVENTION

Various embodiments of the present invention are further described in more detail with reference to the accompanying drawings. However, the present invention can be embodied in many other forms and should not be construed as limited to any certain structure or function presented in the following description. In contrast, these embodiments are provided to make the description of the present invention detailed and complete. According to the present description, it will be apparent to a skilled artisan that the scope of the present invention covers any embodiment of the present invention which is disclosed herein, irrespective of whether this embodiment is implemented independently or in concert with any other embodiment of the present invention. For example, the device disclosed herein can be implemented in practice by using any numbers of the embodiments provided herein. Furthermore, it should be understood that any embodiment of the present invention can be embodied using one or more of the elements presented in the appended claims.

The word "exemplary" is used herein in the meaning of "used as an example or illustration". Any embodiment described herein as "exemplary" should not be necessarily construed as preferable or having an advantage over other embodiments.

Figure 1:
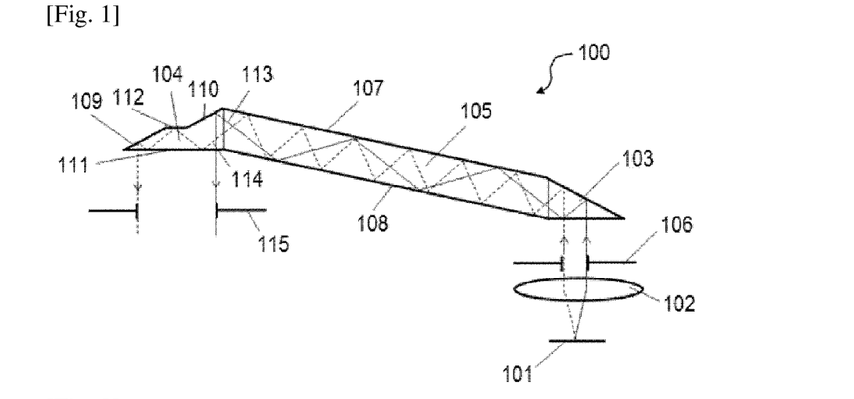
FIG. 1 shows an optical device in accordance with one embodiment of the present invention.

FIG. 1 illustrates an optical device 100 in accordance with one exemplary embodiment of the present invention. As shown in FIG. 1, the device 100 comprises a display 101 (schematically shown as a straight line), an optical means 102 and a lightguide structure. The lightguide structure consists of a first part 103, a second part 104 and an intermediate part 105 by which the first and second parts 103, 104 are coupled to each other. Each of the parts of the lightguide structure can be made of any known materials suitable for light propagation, such as glass, polymeric materials, etc. Furthermore, all parts of the lightguide structure can be made as a monolithic structure.

The display 101 is configured to emit light rays towards the optical means 102. The display 101 can be of any type known in the prior art, such as LCD, LCoS, CRT, LED or OLED display. Furthermore, the display 101 can be made as a microdisplay to provide its compactness, if necessary.

The optical means 102 can have any suitable configuration. As an example, FIG. 1 shows the optical means 102 consisting of one lens. However, the present invention is not limited to such configuration of the optical means and can include a plurality of different lenses or other optical elements, if necessary. The selection of the type and number of the lenses and/or other optical elements depends on particular application, as should be apparent to ones skilled in the art. In particular, the optical means 102 can comprise an eyepiece, collimating lenses, etc. The optical means directs the light rays emitted by the display 101 along its optical axis, thereby forming an exit pupil 106.

The light rays passed through the optical means 102 are incident on the first part 103 coupled to one edge of the intermediate part 105. Preferably, the first part 103 of the lightguide is made as a wedge-like structure, so that the light rays inputted in the first part 103 are trapped inside therein and directed to the intermediate part 105 due to total internal reflection. However, the present invention is not limited to the wedge-like structure of the first part 103, and any other suitable structures can be used, as should be apparent to those skilled in the art.

As follows from FIG. 1, the light rays subsequently enter the intermediate part 105 and propagate inside therein due to total internal reflation from surfaces 107 and 108. Then, the light rays enter the second part 104 coupled to another edge of the intermediate part 105. As shown, the second part 104 is made as a stepped structure having top and bottom surfaces. The top surface has two portions 109 and 110 inclined relative to the bottom surface 111 and a portion 112 located between the portions 109 and 110 parallel to the bottom surface 111. The light rays striking the portions 109 and 110 are reflected therefrom and then outputted from the second part 104 through the bottom surface 111. As an example, FIG. 1 shows two marginal rays 113 and 114 of the light rays emitted from the display 101, which enter the second part 104. More specifically, the marginal ray 113 is directly incident on the portion 110, while the marginal ray 114 is incident on the portion 109 through two reflections from the portion 112 and the bottom surface 111. Thus, the portion 112 and the bottom surface 111 are used to provide the propagation of the light ray 114 further in the second part 104. Here it should be also noted that, in this example, the bottom surface 111 is configured to output only those light rays which are incident thereon at an angle less than the angle of total internal reflection. In this manner, it is possible to enlarge the exit pupil 106 of the optical means 102, as shown in a position 115.

Figure 2:
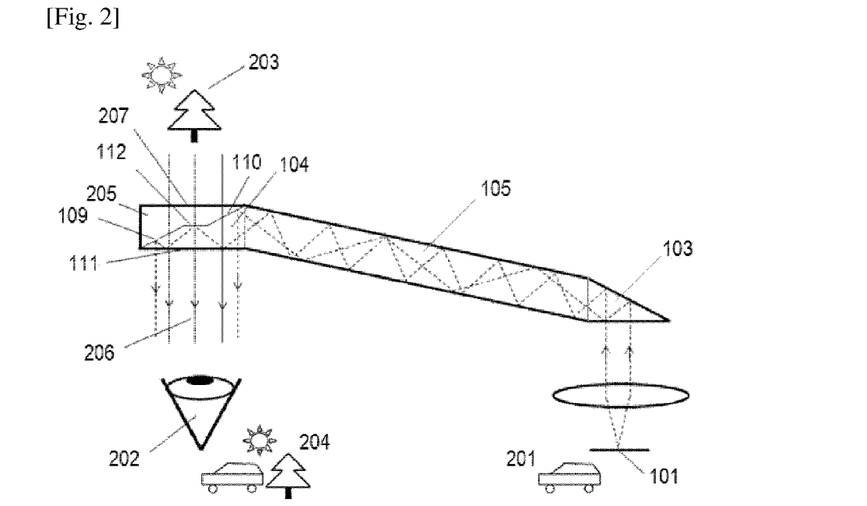
FIG. 2 illustrates the operational principle of the optical device in FIG. 1.

FIG. 2 illustrates the operational principle of the optical device 100. At first, the display emits the light rays constituting an image 201. The image 201 can include any one or more objects, such as a graphic object, text, or their combination. In the present embodiment, the image 201 includes the graphic object, such as a car. Then, the light rays collimated by the optical means 102 pass through the first part 103, the intermediate part 105 and the second part 104 of the lightguide structure, and outputted from the lightguide structure towards the viewer's eye 202. At the same time, the second part 104 of the lightguide structure is further configured to pass therethough incident ambient light from real-world objects. The ambient light is then outputted towards the viewer's eye 202 along with the light rays from the display 101. Thus, the combination of the virtual image 201 and the background image 203 is provided on the retina of the viewer's eye 202. In other words, the viewer can see a combined image 204 consisting of the virtual image 201 and the background image 203.

Additionally, a compensating part 205 can be used to provide the background image 203. The structure of the compensating part 205 is identical to the structure of the second part 104, so that the compensating part 205 adjoins to the second part 104 of the lightguide structure without any gap therebetween. The ambient light 206 coming from the real-word objects goes through a surface 207 at the top of the compensating part 205 and further through the portions 109, 110, 112 and the surface 111 to the viewer's eye 202. Thus, the viewer can observe the combined image 204.

Figure 3:
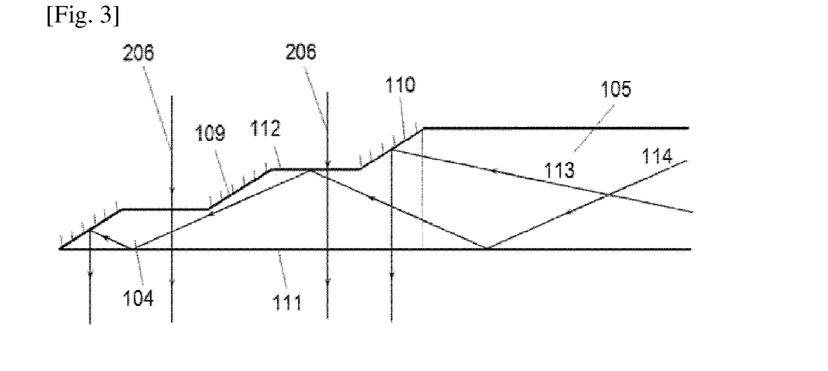
FIGS. 3-6 show different embodiments of the second part of the lightguide structure.

The above-described lightguide structure can be used without the compensating part 205. FIG. 3 shows the side view of the second part 104 where the portions 109 and 110 coated with a minor coating. The marginal rays 113, 114 that strike the portions 109, 110, 112 are reflected towards the viewer's eye, thereby providing the virtual image 201. The ambient light 206 going through the portion 112 provide the background image 203.

Figure 4:
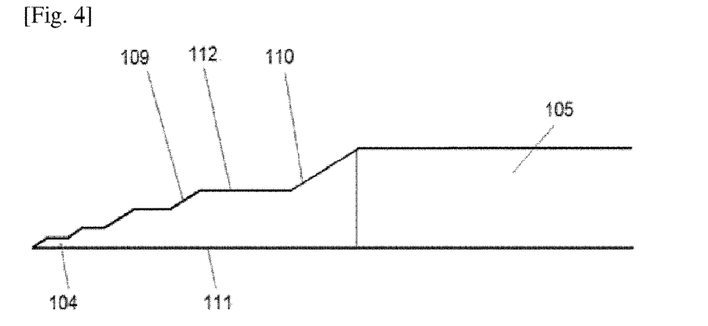
Figure 5:
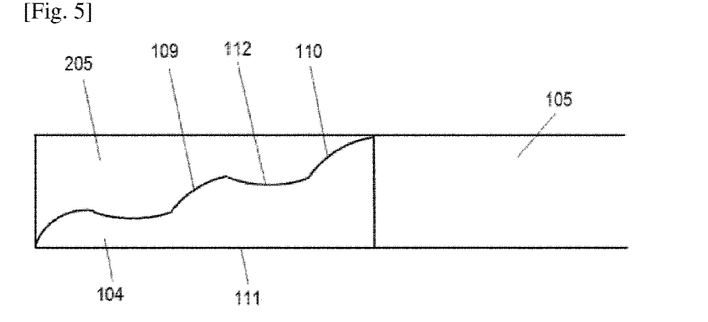
Figure 6:
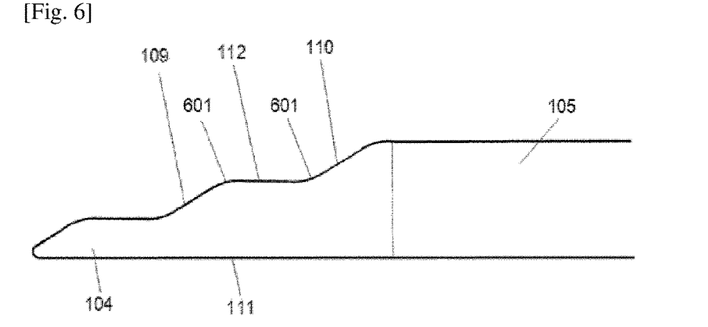

It should be also noted that the second part 104 of the lightguide structure is shown in FIG. 3 as having the top surface with three equal portions inclined relative to the bottom surface 111 and two equal portions parallel to the bottom surface 111. However, the present invention is not limited to this or preciously described (FIGS. 1-2) configuration of the lightguide structure. For example, the top surface of the second part 104 of the lightguide structure can include multiple portions inclined relative to the bottom surface 111 and multiple portions parallel to the bottom surface 111, depending on particular application. Furthermore, these two types of the portions of the top surface of the second part 104 can have different lengths, thereby forming different steps, as illustratively shown in FIG. 4. Moreover, each of the portions 109, 110, 112 can be curved in an arbitrary manner (see FIG. 5) to improve image quality and brightness uniformity, and/or can be also coated with a partially transparent coating to improve uniformity. If required, the joint places 601 of the portions 109, 110, 112 can be also smoothed or rounded (see FIG. 6).

Figure 7:
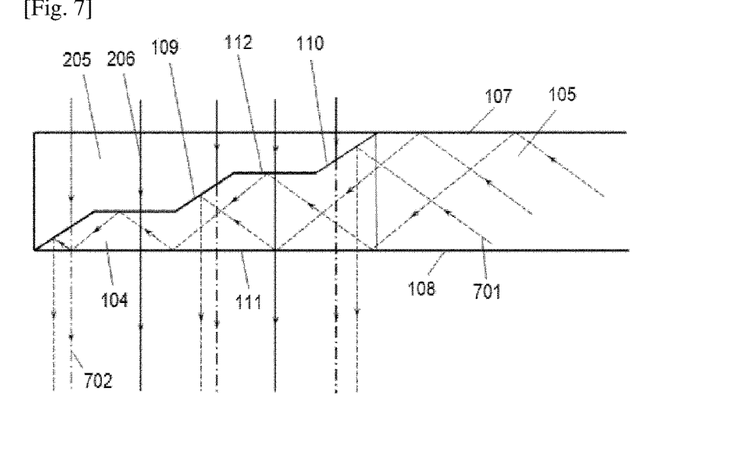
FIG. 7 shows the side view of the lightguide structure with the second part having polarizing coatings.

In one other embodiment, optical coatings can be used to provide specified transmittance and reflectance properties of the surfaces of the second part 104 for simultaneous viewing the background scene and the virtual image from the display 101. In this case, an optical coating can be a polarized coating. The example of such polarized coating is schematically shown in the FIG. 7. S-polarized light rays emitted by the display 101 and propagating through the intermediate part 105 of the lightguide structure are trapped by the second part 104. The portions 109 and 110 of the second part 104 are covered with a polarized coating that can reflect s-polarized light and transmits p-polarized light. So the trapped rays 701 are reflected from the portions 109, 110 via the coating and from the surface 111 via total internal refection. The rays of the ambient light 206 coming from the real-world objects are non-polarized. The rays of the ambient light 206 that go through the portion 112 remain non-polarized. However, the rays of the ambient light 206 that go through the portions 109, 110 become p-polarized (702). The cheapness of coatings is the advantage of the proposed device over others semi-transparent minor-based designs where reflectance and transmittance properties of coatings depend on the angle of incidence. It should be apparent to ones skilled in the art that the present invention is not limited to these polarized coatings and can include other types of the polarized coatings, depending on application. For example, the polarized coatings can be configured to reflect the p-polarized light and transmits the s-polarized light, instead of the case shown in FIG. 7.

Figure 8:
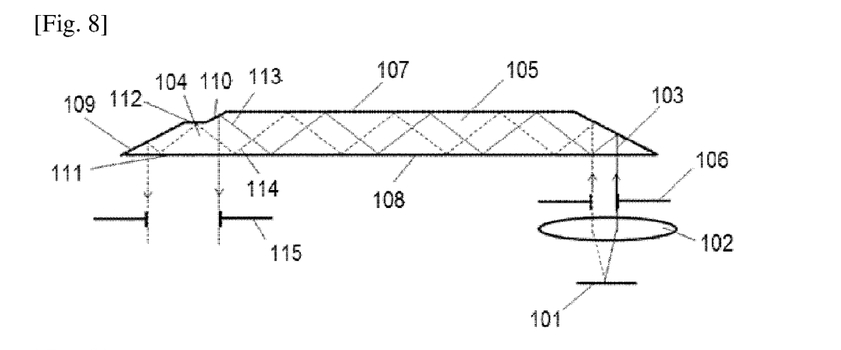
FIG. 8 shows the optical device in which all parts of the lightguide structure are aligned with each other.

In some embodiments, the surfaces 107 and 108 of the intermediate part 105 can be inclined relative to the bottom surface 111 of the second part 104, as shown in FIGS. 1-2. In other embodiments, at least the bottom surfaces of the second part 104 and the intermediate part 105 can be aligned with each other, as shown in FIGS. 3-7. FIG. 8 illustrates the whole side view of the lightguide structure in which the first part 103, the second part 104 and the intermediate part 105 are fully aligned with each other.

Figure 9:
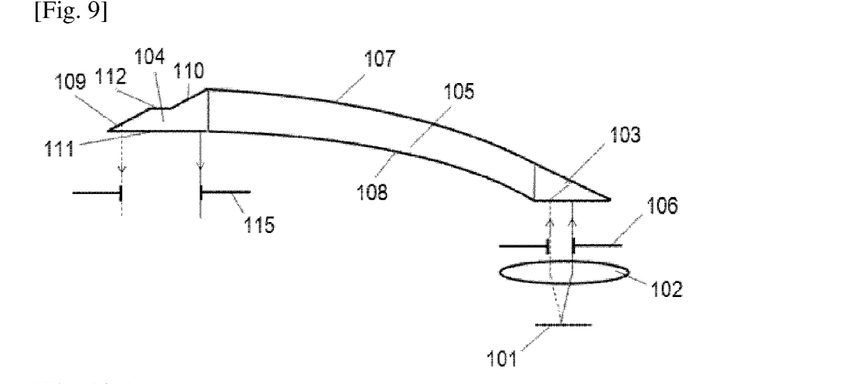
FIG. 9 shows the optical device in which the intermediate part of the lightguide structure has curved surfaces.

In yet other embodiment, the surfaces 107 and 108 of the intermediate part 105 can be curved in an arbitrary manner, as illustrated in FIG. 9.

Figure 10A:
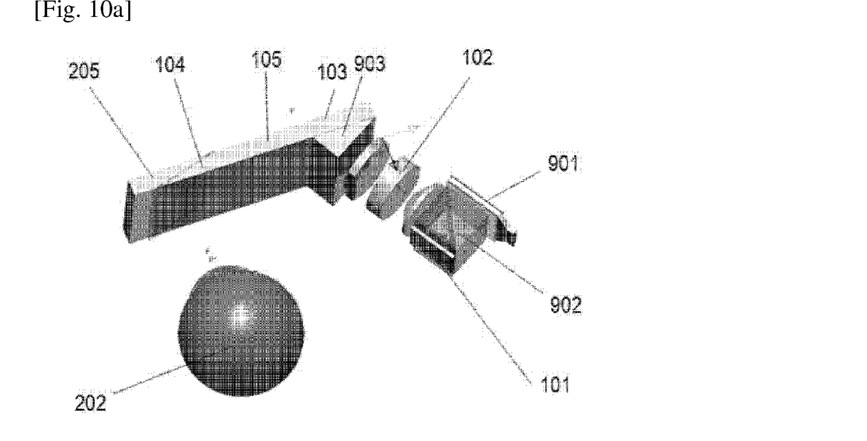
FIG. 10a is the 3D view of the optical device in which LCoS technology is used.
Figure 10B:
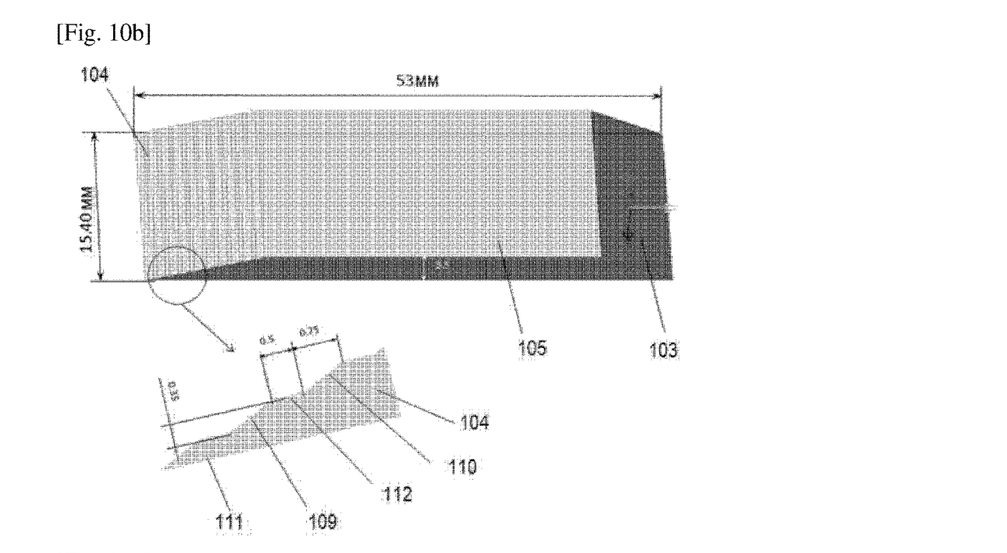
FIG. 10b is the 3D view of the lightguide structure having multiple steps in the second part.

FIG. 10a illustrates the 3D view of the device 100 in which LCoS technology is used. As shown, the device 100 also includes an illumination system 901 and a beam-splitting cube 902. Furthermore, a prism 903 is also attached to the first part 103 to provide the propagation of the light rays through the lightguide structure by total internal reflection. Overall dimensions of the lightguide structure with such configuration are 53×15.4×3.5 mm (see FIG. 10b where all dimensions are given in mm). In particular, the second part 104 has 10 incline portions. The height of the incline portions 109, 110 is 0.35 mm, and their length is 0.75 mm. The surface 111 and the portion 112 are parallel to each other. The length of the portion 112 is 0.5 mm. The optical means for the embodiment in FIG. 10b has the following parameters: the field of view 26°, the exit pupil 13 mm, the length along the optical axis 35 mm, F-number F/1.5.

Figure 11A:
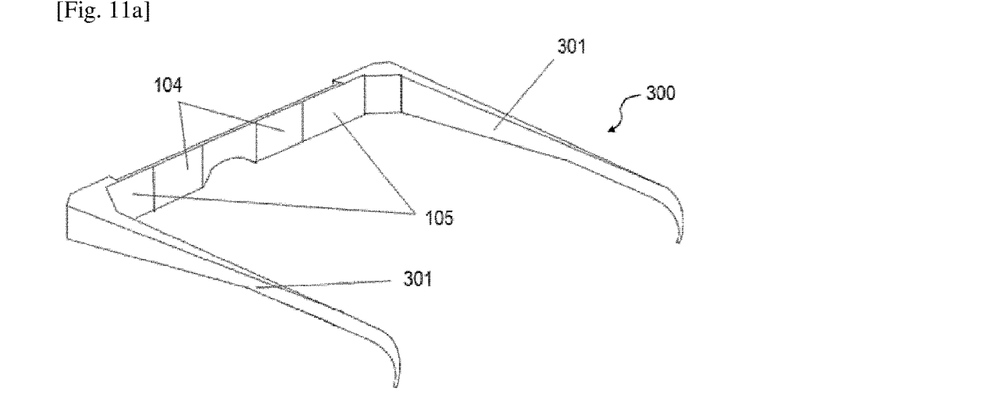
FIG. 11a illustrates an imaging system made in the form of glasses in accordance with one embodiment of the present invention.
Figure 11B:
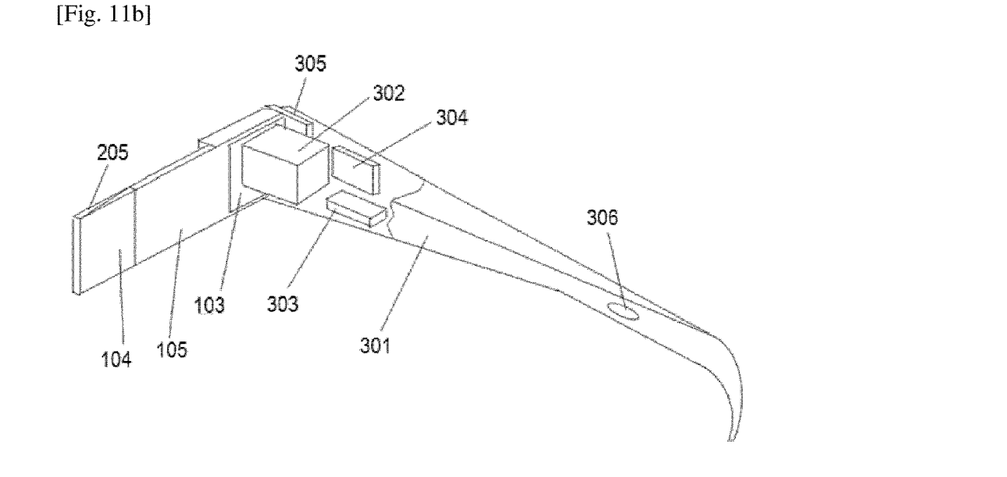

FIG. 11a shows an exemplary imaging system 300. As shown in FIG. 11a, the system 300 is made in the form of glasses with earpieces 301. However, the present invention is not limited to such configuration of the system 300. For example, the system 300 can be also made in the form of a helmet. The construction of the right earpiece 301 is shown in FIG. 11b. The left earpiece 301 has the same construction. Generally, the system 300 comprises two optical devices 100, each embodied in respective one of the earpieces 301. The microdisplay 101 and the optical means 102 are combined within an optical module 302. In this case, it is preferable to implement the display 101 in the form of a microdisplay to provide better compactness. The lightguide structure of the device 100 is arranged such that the first part 103 is faced to the optical module 302 and the second part 104 is faced to a user's eye (not shown). The right earpiece 301 also comprises the following constructive elements: an integrated processor 303, a radio interface 304, an optical interface 305, and an acoustical interface 306. The integrated processor 303 handles images for display to a user. The radio interface 304 receives and/or transmits interactive content via radio waves. The optical interface 305 captures images and sends them to the processor 303. For example, the optical interface 305 can be fulfilled as a camera, a camcorder or a projection lens. The acoustical interface 306 receives and/or transmits interactive content via acoustical waves. For example, the acoustical interface 306 can be fulfilled as a microphone, a dynamic or a bone conduction transducer.

Although the exemplary embodiments of the present invention are disclosed herein, it should be noted that any various changes and modifications can be made in the embodiments of the present invention, without departing from the scope of legal protection which is defined by the appended claims. In the appended claims, the mention of elements in a singular form does not exclude the presence of the plurality of such elements, if not explicitly stated otherwise.

The invention claimed is:

1. A lightguide structure comprising:
   a first portion configured to receive light rays emitted by an external display;
   a second portion configured to output the light rays from the first portion and ambient light incident on the second portion; and
   an intermediate portion disposed between the first portion and the second portion, and configured to reflect the light rays from the first portion and transfer the light rays to the second portion,
   wherein the second portion comprises:
      a plurality of first surfaces connected to each other and forming a stepped structure, the plurality of first surfaces being configured to reflect the light rays from the first portion; and
      at least one second surface configured to output the ambient light and the light rays reflected from the plurality of first surfaces,
   wherein the plurality of first surfaces comprise a plurality of inclined surfaces that are inclined with respect to the at least one second surface and at least one parallel surface located between the inclined surfaces, the at least one parallel surface being substantially parallel to the at least one second surface, and
   wherein a top plane surface of the intermediate portion and a bottom plane surface of the intermediate portion are inclined at a same angle, respectively, relative to a second surface among the at least one second surface of the second portion adjacent to the bottom plane surface of the intermediate portion.

2. The lightguide structure of claim 1, wherein the second portion is further configured to pass the ambient light incident on the plurality of first surfaces through the at least one second surface towards a viewer together with the outputted light rays.

3. The lightguide structure of claim 1, wherein the at least one second surface and all of the plurality of first surfaces of the second portion are planar.

4. The lightguide structure of claim 1, wherein all of the plurality of first surfaces of the second portion are curved alternately in a concave shape and a convex shape relative to the at least one second surface.

5. The lightguide structure of claim 1, wherein joint places connecting each of the plurality of first surfaces and the at least one second surface of the second portion are rounded.

6. The lightguide structure of claim 1, wherein the first portion, the second portion and the intermediate portion are implemented as a monolithic structure.

7. The lightguide structure of claim 1, wherein at least one of the plurality of first surfaces of the second portion is inclined relative to the at least one second surface of the second portion, and
   wherein each of the at least one of the plurality of first surfaces of the second portion inclined relative to the at least one second surface of the second portion is coated by a mirror coating.

8. The lightguide structure of claim 1, further comprising a compensating portion, and wherein a structure a surface of the compensating portion is identical to the stepped structure of the plurality of first surfaces of the second portion so that the compensating portion adjoins the second portion with no gap therebetween.

9. The lightguide structure of claim 1, wherein the first portion has a convex structure.

10. The lightguide structure of claim 9, wherein the convex structure is a wedge-like structure.

11. An optical device comprising:
a display configured to emit light rays;
at least one optical means configured to direct the light rays along its optical axis; and
at least one lightguide structure comprising:
- a first portion configured to receive light rays emitted by an external display;
- a second portion configured to output the light rays from the first portion and ambient light incident on the second portion; and
- an intermediate portion disposed between the first portion and the second portion, and configured to reflect the light rays from the first portion and transfer the light rays to the second portion, wherein the second portion comprises:
- a plurality of first surfaces connected to each other and forming a stepped structure, the plurality of first surfaces being configured to reflect the light rays from the first portion; and
- at least one second surface configured to output the ambient light and the light rays reflected from the plurality of first surfaces, wherein the plurality of first surfaces comprise a plurality of inclined surfaces that are inclined with respect to the at least one second surface and at least one parallel surface located between the inclined surfaces, the at least one parallel surface being substantially parallel to the at least one second surface, wherein a top plane surface of the intermediate portion and a bottom plane surface of the intermediate portion are inclined at a same angle, respectively, relative to a second surface among the at least one second surface of the second portion adjacent to the bottom plane surface of the intermediate portion.

12. The optical device of claim 11, wherein the display comprises as a microdisplay.

13. The optical device of claim 11, wherein the at least one optical means comprises an eyepiece or collimating lens.

14. The optical device of claim 11, wherein the second portion is further configured to pass the ambient light incident on the plurality of first surfaces through the at least one second surface towards a viewer together with the outputted light rays.

15. The optical device of claim 11, wherein the at least one second surface and all of the plurality of first surfaces of the second portion are planar.

16. The optical device of claim 11, wherein at least one of the plurality of first surfaces of the second portion is inclined relative to the at least one second surface of the second portion, and
wherein each of the at least one of the plurality of first surfaces of the second portion inclined relative to the at least one second surface of the second portion is coated by a mirror coating.

17. The optical device of claim 11, further comprising a compensating portion, and wherein a structure a surface of the compensating portion is identical to the stepped structure of the plurality of first surfaces of the second portion so that the compensating portion adjoins the second portion with no gap therebetween.

* * * * *